(12) United States Patent
Lozano et al.

(10) Patent No.: US 12,404,041 B2
(45) Date of Patent: Sep. 2, 2025

(54) BI-MODAL CHEMICAL-ELECTRIC SPACE PROPULSION

(71) Applicant: Massachusetts Institute of Technology, Cambridge, MA (US)

(72) Inventors: Paulo C. Lozano, Arlington, MA (US); Amelia Bruno, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/268,686

(22) PCT Filed: Oct. 20, 2021

(86) PCT No.: PCT/US2021/055724
§ 371 (c)(1),
(2) Date: Jun. 21, 2023

(87) PCT Pub. No.: WO2022/139942
PCT Pub. Date: Jun. 30, 2022

(65) Prior Publication Data
US 2024/0076062 A1    Mar. 7, 2024

Related U.S. Application Data

(60) Provisional application No. 63/128,693, filed on Dec. 21, 2020.

(51) Int. Cl.
*B64G 1/26* (2006.01)
*B64G 1/40* (2006.01)

(52) U.S. Cl.
CPC ............ *B64G 1/4026* (2023.08); *B64G 1/26* (2013.01); *B64G 1/4021* (2023.08); *B64G 1/411* (2023.08)

(58) Field of Classification Search
CPC ........ B64G 1/26; B64G 1/4021; B64G 1/405; B64G 1/402; B64G 1/4026; B64G 1/411;
(Continued)

(56) References Cited

U.S. PATENT DOCUMENTS 8,961,657 B2 * 2/2015 Fujioka .................. B01D 19/00
 95/266
10,840,811 B2 * 11/2020 Fogel ................ H02M 3/33561
(Continued)

FOREIGN PATENT DOCUMENTS

WO    WO 2010/036291 A2    4/2010
WO    WO2010036291    *    4/2010    ............. B64G 1/401

OTHER PUBLICATIONS

International Search Report and Written Opinion mailed Feb. 1, 2022, for Application No. PCT/US2021/055724.
(Continued)

*Primary Examiner* — Medhat Badawi
(74) *Attorney, Agent, or Firm* — Wolf, Greenfield & Sacks, P.C.

(57) ABSTRACT

Bi-modal propulsion systems and related methods are generally described. In some embodiments, a bi-modal propulsion system may employ a single propellant for both chemical thruster(s), operating at elevated pressures, and electrical thruster(s) (e.g., electro spray thruster), operating at reduced pressures. The propellant pressure may be reduced to a desired operational range of the electrical thruster(s) using any appropriate construction including, for example, capillaries configured to reduce the pressure of the propellant to an operational range of the electrical thruster(s). In some embodiments, the reduced pressure of the propellant may be lower than a vapor pressure of at least one volatile component of the propellant, leading to the formation of "bubbles" within the propellant line. The presence of alternating gas and liquid phases along a flow path between a propellant (Continued)

tank and the electrical thruster(s) may help to electrically insulate the electrical thruster from the rest of the system.

20 Claims, 10 Drawing Sheets

(58) Field of Classification Search
CPC ....... B64G 1/002; B64G 1/415; F03H 1/0012; F03H 1/0037
See application file for complete search history.

(56) References Cited

U.S. PATENT DOCUMENTS

| | | | |
|---|---|---|---|
| 12,065,270 B1* | 8/2024 | Allison | F02K 9/44 |
| 2005/0257515 A1 | 11/2005 | Song | |
| 2010/0107602 A1* | 5/2010 | Valentian | H05H 1/34 |
| | | | 60/39.826 |
| 2013/0228700 A1* | 9/2013 | Lozano | F03H 1/0012 |
| | | | 205/665 |
| 2014/0054809 A1* | 2/2014 | Lozano | H01J 37/08 |
| | | | 264/28 |
| 2016/0010631 A1* | 1/2016 | King | F03H 1/0056 |
| | | | 60/202 |
| 2016/0297549 A1* | 10/2016 | Lozano | B64G 1/413 |
| 2019/0135457 A1* | 5/2019 | Lozano | F03H 1/0012 |
| 2019/0264113 A1* | 8/2019 | Choi | C10G 29/22 |
| 2019/0264666 A1* | 8/2019 | Lozano | B64G 1/405 |
| 2019/0330496 A1* | 10/2019 | Fukushi | H01M 8/0276 |
| 2020/0102100 A1* | 4/2020 | Lozano | B64G 1/402 |
| 2021/0251452 A1* | 8/2021 | Meulendijks | A47L 9/2826 |
| 2022/0195964 A1* | 6/2022 | Lozano | F03H 1/0012 |
| 2023/0038955 A1* | 2/2023 | Bellec | F17C 5/007 |
| 2023/0150698 A1* | 5/2023 | King | B64G 1/402 |
| | | | 244/172.2 |
| 2024/0076062 A1* | 3/2024 | Lozano | B64G 1/4021 |

OTHER PUBLICATIONS

International Preliminary Report on Patentability mailed Jun. 29, 2023, for Application No. PCT/US2021/055724.

* cited by examiner

BI-MODAL CHEMICAL-ELECTRIC SPACE PROPULSION

CROSS-REFERENCE TO RELATED APPLICATIONS

This application is a national stage filing under 35 U.S.C. § 371 of international application serial number PCT/US2021/055724, filed Oct. 20, 2021, which claims the benefit under 35 U.S.C. § 119(e) of U.S. provisional application Ser. No. 63/128,693, filed Dec. 21, 2020, the disclosure of each of which is incorporated by reference in its entirety.

GOVERNMENT FUNDING

This invention was made with Government support under 80NSSC19C0549 awarded by National Aeronautics and Space Administration. The Government has certain rights in the invention.

FIELD

The disclosed embodiments are generally related to devices and methods for space propulsion. More specifically, methods and apparatuses including embodiments related to bi-modal chemical-electrical space propulsion are disclosed.

BACKGROUND

Chemical propulsion technologies are widely used for spacecraft propulsion in space exploration applications. Chemical propulsion technologies make use of chemical reactions (e.g., exothermic decomposition) of solid or liquid propellants to form expanding gases which generate thrust to propel the spacecraft. Chemical propulsion systems typically feature high thrusts, which can be useful when launching away from planetary surfaces.

Electric propulsion technologies such as ion engines and Hall effect thrusters make use of accelerating beams of ions with a combination of electric and magnetic fields to generate thrust. Electric propulsion systems typically feature higher specific impulse, the amount of thrust produced per unit flow rate of propellant used, and greater mass savings in comparison with liquid and solid propellant chemical propulsion technologies.

SUMMARY

In some embodiments, a propulsion system includes a tank configured to hold an ionic liquid at a first pressure; at least one electrical thruster in selective fluid communication with the tank; and at least one capillary positioned along a flow path between the tank and the at least one electrical thruster, the at least one capillary in fluid communication with the tank and the at least one electrical thruster, wherein the at least one capillary is configured to de-pressurize the ionic liquid to a second pressure less than the first pressure, and wherein the second pressure is within an operational pressure range of the at least one electrical thruster.

In some embodiments, a propulsion system includes tank configured to hold an ionic liquid, the ionic liquid including at least one volatile component; at least one electrical thruster in selective fluid communication with the tank; and at least one conduit positioned in between the tank and the at least one electrical thruster, wherein an inlet pressure of the at least one conduit is below a vapor pressure of the at least one volatile component, wherein the at least one volatile component at least partially evaporates within the at least one conduit to form a gas phase, and wherein the gas phase electrically isolates the at least one electrical thruster from the tank.

In some embodiments, a propulsion system includes a tank configured to hold an ionic liquid at a first pressure; at least one chemical thruster in selective fluid communication with the tank; at least one electrical thruster in selective fluid communication with the tank; and at least one feed system disposed along a flow path between the at least one electrical thruster and the tank, wherein the at least one feed system is configured to de-pressurize the ionic liquid from the first pressure to a second pressure.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
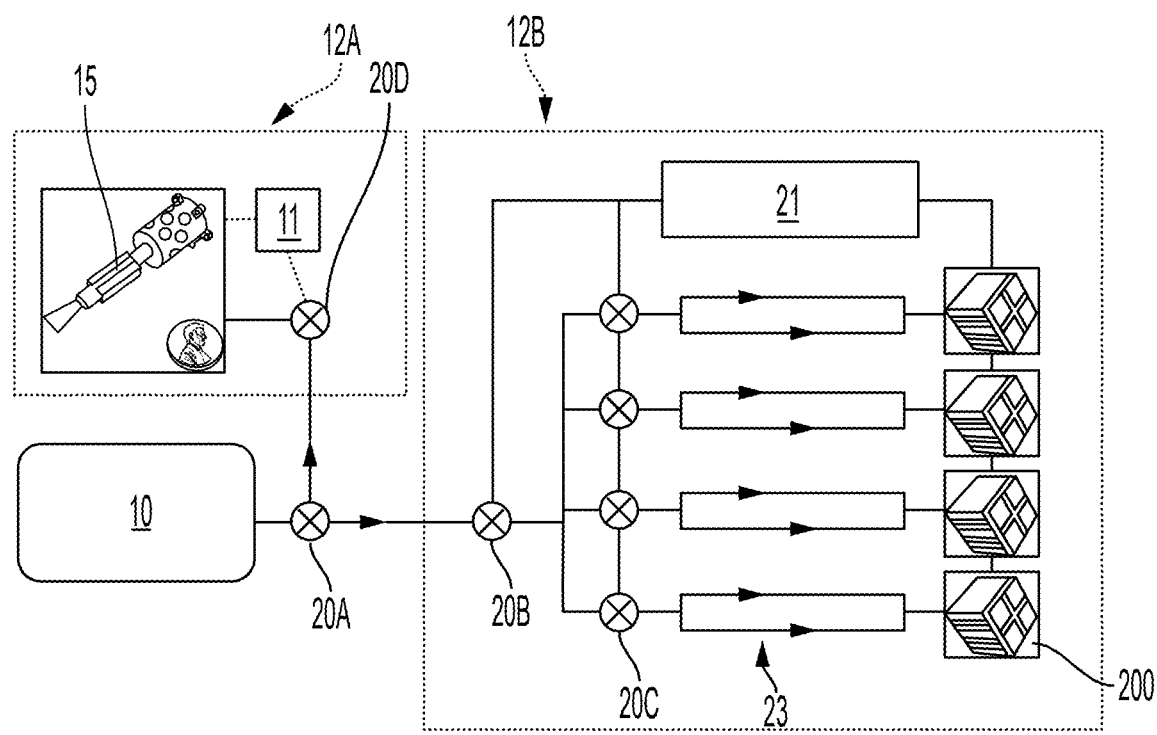
FIG. 1 shows, according to some embodiments, a schematic diagram of a bi-modal propulsion system.

The most prominent modes of spacecraft propulsion are chemical and electric propulsion. Chemical thrusters are commonly used due to their reliability and simplicity. To fire, a monopropellant is injected into a chamber from a pressurized vessel where it exothermically decomposes (catalytically, thermally, or both) and produces thrust. The most common monopropellant is hydrazine with an aluminum oxide catalyst. While chemical thrusters provide a wide range of thrusts, including high thrusts (useful for impulsive maneuvers), at moderate specific impulse, the toxicity of most common monopropellants raise safety concerns and incur high handling costs. Electrical thrusters feature a number of advantages over chemical propulsion systems, including high compactness and performance. Electrical thrusters use onboard energy (e.g., from solar panels) to generate and accelerate ions (e.g., from an ionic liquid source) which may provide higher specific impulse for long-term station keeping, orbit maintenance, or other desired applications.

Given the complementary nature of the two modes of propulsion, the Inventors have recognized the advantages associated with having both modes available on the same spacecraft to improve mission flexibility. However, the propellants used for each mode (e.g., hydrazine for standard chemical thrusters and xenon for standard electrical thrusters) may be highly incompatible across the different modes for typical propulsion systems. To carry both modes of propulsion, a spacecraft would typically need to carry two completely independent subsystems with separate propellants and propellant management. While this has been accomplished on larger, high-performance spacecraft (such as NASA's Dawn) this strategy is difficult to implement on small satellites, where power, mass, and volume cannot be readily expanded to a second propulsion subsystem.

Recent investigation of low-toxicity alternatives to toxic chemical propellants such as hydrazine in chemical thrusters, for improved safety and handling, has led to discovery of a new family of "green" monopropellants. Notably, the Inventors have recognized that many of these green monopropellants are also room temperature ionic liquids, and thus may be compatible with electrical propulsion systems such as electrospray thrusters. These green monopropellants have been found to perform similarly to conventional monopropellants in chemical thrusters. A large number of these alternatives have been discovered, including dinitramide (ADN) based and hydroxylammonium nitrate (HAN) based propellants. In particular, a HAN-based fuel/oxidizer blend known as AF-315E or ASCENT, including water and a highly hygroscopic fuel, was successfully demonstrated as a suitable chemical propellant in spaceflight through NASA's Green Propellant Infusion Mission (GPIM).

However, the Inventors have recognized that differences in operational conditions between chemical and electrical thrusters (e.g., propellant pressure, electrical conductivity, etc.) present challenges in developing a bi-modal propulsion system with a common propellant (e.g., ASCENT). Thus, the Inventors have recognized a need for a unified propulsion system with a common propellant which allows for functional chemical and electrical propulsion. Such a system may beneficially reduce the overall footprint of the system in comparison to two independent propulsion systems. This unified propulsion system may be particularly beneficial for small spacecraft and satellites, such as CubeSats. However, instances in which different benefits are offered by the systems and methods disclosed herein are also possible.

Based on the foregoing, the Inventors have recognized the benefits associated with bi-modal propulsion systems which employ existing chemical thruster technologies and advances in green monopropellant development. The bi-modal propulsion system may integrate one or more chemical monopropellant thrusters with one or more electrical (e.g., electrospray) thrusters with a single, shared propellant tank. Such a propulsion system may include pressure controls (both dynamic and/or static components) allowing for independent pressure control of the propellant for each propulsion subsystem (e.g., chemical and electrical) and electrical isolation of the electrical propulsion subsystem from the common propellant tank and chemical propulsion subsystem.

In some embodiments, a bi-modal propulsion system may include at least one chemical propulsion subsystem, at least one electrical propulsion subsystem, and a shared propellant tank. The propellant tank may house any appropriate propellant including, for example, a monopropellant such as a green monopropellant (e.g., ASCENT), that is compatible with both the electrical and chemical propulsion systems. In some embodiments, the propellant may be housed at pressures compatible with the chemical propulsion subsystems, such that propellant may be routed to the subsystem and fired per conventional chemical thruster protocols. Accordingly, the bi-modal propulsion system may also include a propellant management system for conditioning the high-pressure propellant to be compatible with the electrical propulsion subsystem, which operates at lower pressures. In addition, given the high voltages employed in operation of electrical thrusters, the bi-modal propulsion systems described herein may include features to ensure electrical isolation between the conductive propellant at the thrusters (which may be exposed to high voltages, e.g., ~1 kV) and the propellant in the shared tank.

In some embodiments, a chemical propulsion subsystem of a bi-modal propulsion system may operate at feed pressures (e.g., 400-800 psi) that are greater than the feed pressures of a corresponding electrical propulsion subsystem, which may operate at lower propellant pressures, (e.g., <10 psi). Of course, while specific exemplary pressures are given above, other absolute pressures may be used for each propulsion subsystem. In either case, a bi-modal propulsion system may include a propellant pressure management system in some embodiments. In some embodiments, the propellant pressure management system may include one or more capillaries, or other appropriate hydraulic component, designed to throttle the pressure of the propellant before it reaches the electrical thrusters. As will be described in greater detail below, the capillaries, and/or other components, may be configured to provide a desired pressure drop, such that the outlet pressure is compatible with the electrical thrusters.

In some embodiments, the electrical thrusters of an electrical propulsion subsystem may be electrospray thrusters, which are compact electrostatic thrusters. Electrospray thrusters hold ionic fluids (e.g., an ionic propellant) at the tip of a small and sharp emitter under vacuum. A strong electric field may then be applied across the emitter, forcing the ions to evaporate and accelerate outward in a spray-like form, producing thrust. The electrospray thrusters may include a cluster of emitter arrays, where the overall thrust per unit area may be comparable to standard plasma thrusters (e.g., ion engines, Hall thrusters). However, since ionic liquids have negligible vapor pressure and ions may be evaporated from the propellant directly, pressurization tanks (which may be large and bulky) and/or ionization chambers may be omitted in some designs. Accordingly, electrospray thrusters may require a significantly lower footprint on a spacecraft compared to standard plasma thrusters. Of course, while a specific type of electric thruster is noted, the current disclosure is not so limited as any appropriate type of electric thruster may be used with the systems disclosed herein.

In some embodiments, the electrical thrusters of an electrical propulsion subsystem may apply high voltages (e.g., 1 kV) to the common propellant. Given the conductive nature of the ionic propellant described herein, a direct electrical connection may be formed through the liquid propellant. Depending on the configuration of the system this may result in an undesirable electrical connection between the propellant in the electrical thrusters (e.g., in reservoirs associated with electrospray thrusters) and one or more grounded components in the system including the common propellant tank. Such a connection may then draw undesirably high current, consuming much of the available power and/or creating a short circuit in the system, leading to system malfunction or damage. Accordingly, a break in the liquid path of the propellant may be introduced between one or more components of the system to provide electrical isolation.

In some embodiments, the break in the liquid path may be accomplished by taking advantage of the material composition of the propellant. The propellant may include a volatile component (e.g., water in the case of ASCENT and other similar HAN-based propellants), which may be at least partially evaporated to form bubbles or gaps within the propellant line. In some embodiments, the propellant may be de-pressurized from a first larger pressure to a second smaller pressure that is less than the vapor pressure of the volatile component. This may be accomplished using one or more valves, flow restrictions, capillaries, combinations of the forgoing, and/or any other appropriate hydraulic component capable of controlling the pressure of the propellant. Such a two-phase propellant flow (e.g., serially arranged gas and liquid phases present in the flow path) may then flow through a non-wetting (e.g., hydrophobic) conduit or tubing (e.g., formed of PTFE) that is not wetted by the liquid propellant, such that the vaporized volatile compound may form gaps within the propellant. The presence of the gas phase between isolated liquid phases breaks up the continuous liquid path and electrically isolates the electric thruster from the other upstream components of the system. In some embodiments, the electrical isolation due to vapor gaps in the propellant line may be verified using impedance measurements.

It should be appreciated that the present disclosure is not limited by the material composition of the common propellant. Accordingly, any suitable propellant which may be used in both chemical and electrical (e.g., electrospray) thruster systems may be used. For example, propellants formed of hydroxylammonium nitrate (HAN), ammonium dinitramide (ADN), hydrazinium nitroformate (HNF), ammonium nitrate (AN), hydrazinium nitrate (HN), ammonium azide (AA), hydrazinium azide (HA), hydroxyethylhydrazinium nitrate (HEHN), combinations thereof, and/or other propellants may be used in the bi-modal propulsions systems herein.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows, according to some embodiments, a bi-modal propulsion system including a chemical propulsion subsystem 12A and an electrical propulsion subsystem 12B, both connected to a common propellant tank 10. The tank 10 may include a common propellant (e.g., a monopropellant compatible with both chemical propulsion as well as electrical propulsion) stored at high pressure (e.g., 800 psi). The bi-modal propulsion system may include one or more high pressure valves (HPVs) 20A, 20B, 20C, 20D to control propellant flow to either the chemical 12A or electrical 12B propulsion subsystems and/or within the subsystems. However, other appropriate types of valves and/or other hydraulic control components may be used, including other valves, as the disclosure is not limited to only using HPVs to control the flow of fluid through the system.

In some embodiments, one or more HPVs in the bi-modal system may include features such as rapid response times, low leak rates, and compatibility with the propellant at various pressures/temperatures of the subsystems. In addition, the HPVs may be lightweight and compact for spaceflight application. In some embodiments, HPVs used in bi-modal systems employing electrospray thrusters may reliably and repeatedly deliver small volumes of propellant (e.g., 2-10 mL). As will be described in detail below, each HPV may be controlled to open and close to route propellant throughout the bi-modal system. In some embodiments, one or more HPVs in the system may be electromagnetically operated. For example, one or more HPVs in the system may be solenoid valves. It should be appreciated that the bi-modal systems described herein may employ any suitable type, number, and arrangement of HPVs for operation of the bi-modal system. For example, any one HPV 20A, 20B, 20C, 20D shown in FIG. 1 may represent more than one HPV for redundancy.

In some embodiments, the chemical propulsion subsystem 12A may include one or more HPVs 20D disposed on a flow path between the propellant tank 10 and the chemical propulsion subsystem to control flow from the propellant tank 10 to one or more monopropellant thrusters 15. The one or more HPVs 20D and the thrusters 15 may be controlled by one or more controllers, e.g., one or more processors 11, as shown in FIG. 1. It should be appreciated that any suitable monopropellant thruster known in the art may be employed for the chemical propulsion subsystem, as the present disclosure is not so limited. For example, the chemical thrusters 15 may be a GR-1 thruster (Aerojet Rocketdyne) or a BGT-X5 thruster (Busek Co. Inc.), as shown in FIG. 1. Any suitable chemical thruster and thruster infrastructure compatible with monopropellants, such as ASCENT, may be employed, as the present disclosure is not so limited. It should be appreciated that the chemical propulsion subsystem may include other fluid and/or electronics control components not shown in FIG. 1, for safe and proper operation of the system.

The propellant tank 10 may hold a common propellant at elevated pressures (e.g., 800 psi), suitable for the chemical propulsion subsystem 12A, which may use a relatively large feed pressures (e.g., between 400 and 800 psi) to operate. In contrast, the electrical propulsion subsystem 12B, specifically, one or more thrusters 200 (e.g., electrospray thrusters), may use lower feed pressures (e.g., <10 psi) than those used for the chemical propulsion subsystem for operation. Accordingly, the bi-modal system may include one or more propellant pressure control components to reduce propellant pressure flowing from the high-pressure propellant tank 10 to the one or more thrusters 200.

It should be appreciated that although four electrical thrusters 200 are shown in FIG. 1, any suitable number of electrical thrusters may be employed. In some embodiments, multiple electrical thrusters may be used for redundancy purposes, such that if one thruster is damaged or unavailable, another thruster may be able to fulfill the navigational needs of the spacecraft. Depending on the embodiment, a single combined valve, such as high-pressure valve 20B, may be used to control the flow of propellant to the thrusters and/or individual valves 20C associated with separate electric thrusters 200 may be used to control the flow of propellant to the individual thrusters. The thrusters 200 may be any suitable thrusters compatible with an electrical propulsion system. For example, in some embodiments, the thrusters 200 may be electrospray thrusters. It should be appreciated that the present disclosure is not limited by the number, arrangement, or type of electrical or chemical thrusters employed in the bi-modal propulsion system.

In some embodiments, propellant pressure may be reduced from the tank pressure with one or more (e.g., four, as shown in FIG. 1) feed systems 23, shown in FIG. 1. The electrical propulsion subsystem 12B may also include one or more HPVs 20B/20C to control propellant flow within the subsystem 12B. For example, the subsystem 12B may include at least one HPV 20B to control flow of propellant from the propellant tank 10 to the subsystem 12B, as well as multiple HPVs 20C to control flow of propellant within each individual feed system 23, as shown in FIG. 1. The one or more HPVs 20B/20C may be controlled by an associated controller, e.g., one or more processors 21. It should be appreciated that more than one HPV 20B and more than one HPV 20C may be used in an electrical propulsion subsystem for redundancies and increased safety measures, and that any suitable number or arrangement of HPVs may be employed, as the present disclosure is not so limited.

Figure 2:
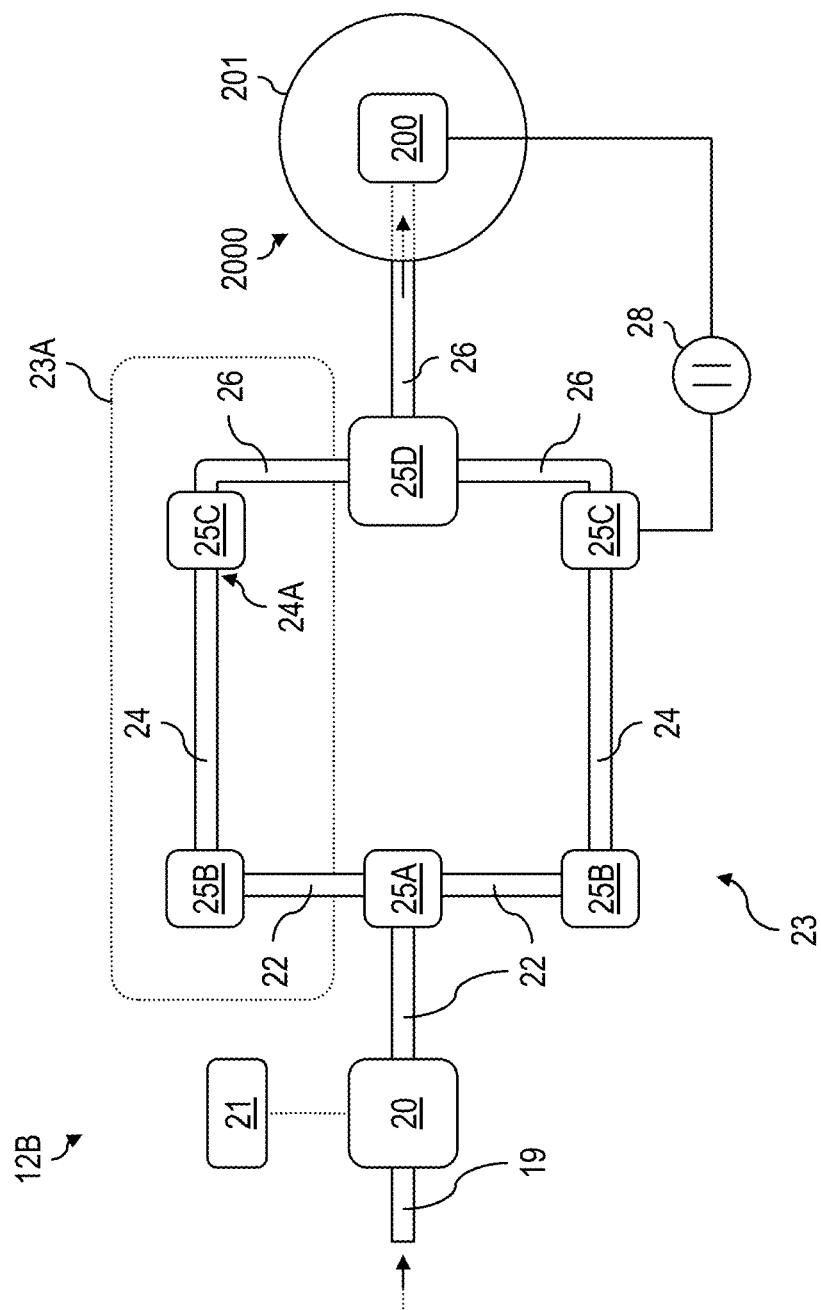
FIG. 2 shows, according to some embodiments, schematic diagram of an electrical propulsion system.

FIG. 2 shows an electrical propulsion subsystem 12B according to some embodiments. Propellant may flow from a high-pressure tank (see tank 10 in FIG. 1) into an HPV 20 through a line, tube, or any other suitable conduit 19. As described previously, the HPV 20 (along with any other valve or fluid flow module in the bi-modal system) may be controlled with one or more controllers such as the depicted one or more processors 21. When the HPV 20 is opened, propellant may flow out of the HPV 20 and into a feed system 23 to reduce the pressure of the propellant to a suitable pressure for one or more thrusters 200.

In some embodiments, the feed system 23 may include one or more feed lines 23A for redundancy. For example, if one feed line is clogged or damaged during operation, the system may still continue to function by flowing propellant through the undamaged feed lines. FIG. 2 shows a feed system 23 with two feed lines. Each feed line (e.g., feed line 23A) includes a conduit 22, a capillary 24, and a hydrophobic conduit 26. In some embodiments, the feed system may include one or more branch tee fittings 25A, 25D for splitting or joining propellant lines, as well as one or more couplings 25B, 25C for changing the propellant line types (e.g., switching between the conduit and the capillary, or between the capillary and the hydrophobic conduit, as shown in FIG. 2). It should be appreciated that FIG. 2 depicts a simplified fluidic system for explanation purposes only, and that any number of fittings or other fluid routing components (e.g., manifolds, extra conduits, elbow fittings, union fittings, couplings, etc.) may be employed to direct propellant flow within the system, as the present disclosure is not so limited. It should be appreciated that the terms "conduit," "tubing," and "capillary" may refer to any suitable structure through which propellant may flow through.

The conduits 22 may direct propellant from the HPV 20 to one or more capillaries 24. As will be described in detail below, the capillaries 24 may be configured to reduce the pressure of the propellant to a lower desired operating pressure prior to its delivery to the thrusters 200. In some embodiments, the conduits 22 may be formed of any suitable material compatible with the propellant and the high pressures at which the propellant may flow within the conduits 22. For example, the conduits 22 may be formed of PEEK. In some embodiments, the electrical propulsion subsystem 12B may not employ any conduits 22, such that propellant may directly flow from an HPV 20 to a capillary 24.

In some embodiments, the capillaries 24 may reduce the pressure of the propellant from a high pressure of a common propellant tank (which may, in some embodiments, be at 400-800 psi) to a lower pressure suitable for thrusters 200 (which may require propellant pressures <10 psi). The capillaries 24 may reduce propellant pressure by way of throttling the propellant as it flows through the one or more capillaries 24. The pressure drop ΔP across a capillary with a length L and diameter D may be estimated using Equation (1) (Hagen-Poiseuille equation):

$$Q = \frac{\pi D^4}{128 \mu L} \Delta P \quad (1)$$

where Q is the volumetric flow rate and μ is the viscosity of the fluid (e.g., propellant). The volumetric flow rate Q can be calculated as the quotient of the desired fill volume for the thrusters and the how long the associated upstream HPV remains open (e.g., opened time $t_{open}$).

The geometry of the capillary (e.g., length and diameter) may therefore be adjusted such that the pressure at the end of the capillary (e.g., at point 24A in FIG. 2), may be suitable for operation of the thrusters 200, which may be any desired electric thruster as described herein. As will be described in greater detail below, the geometry of the capillaries may also be adjusted to achieve an outlet pressure lower than the vapor pressure of one or more volatile components within the propellant.

In some embodiments, the pressure drop ΔP (measured as the difference between the inlet and outlet pressures of the capillary) across a capillary may be any suitable pressure drop desired for the operation of the electrical thruster. In some embodiments, the ratio between the inlet pressure of the capillary and the outlet pressure of the capillary—or the relative amount of reduced pressure of fluid flowing through the capillary—may be less than 1, such that the capillary may reduce the fluid pressure. The ratio between the inlet and outlet pressures of the capillary may be at least 0.0001, 0.001, 0.002, 0.005, 0.01, 0.02, 0.05, 0.1, 0.2, 0.5, 1, and/or any other suitable ratio. The ratio between the inlet and outlet pressures of the capillary may also be less than or equal to 1, 0.5, 0.2, 0.1, 0.05, 0.02, 0.01, 0.005, 0.002, 0.001, 0.0001, and/or any other suitable ratio. Combinations of the ranges are also contemplated, including a ratio between the inlet and outlet pressures of the capillary between 0.0001 and 1, 0.001 and 1, 0.005 and 1, and/or any other suitable combination. Of course, other ranges, including ranges both greater than and less than those noted above are also contemplated as the present disclosure is not so limited. Additionally, while pressure ratios for a capillary are provided above, it should be understood that the above pressure ratios may apply to the inlet and outlet of any appropriate hydraulic component capable of reducing the pressure of the propellant to be within a desired operational pressure range of an associated electric thruster. In view of the above, it should be appreciated that the outlet pressure of the propellant may be any suitable pressure below the inlet pressure of the propellant.

It should be appreciated that in some embodiments, the pressure drop of the propellant may be achieved with more than one capillary. Accordingly, propellant may flow through a first capillary for a first pressure drop and subsequently through a second (and, in some embodiments, subsequent capillaries) to achieve the desired total pressure drop rendering the propellant operational for the electrical thrusters.

In some embodiments, propellant may flow at the reduced pressure from the capillaries 24 to the associated one or more hydrophobic conduits 26 (e.g., through a coupling 25C, as shown in FIG. 2). As will be described in greater detail below, the thrusters 200 are fired when an operating voltage (e.g., 1 kV) is applied to the propellant, which may be conductive (e.g., ionic propellants). As detailed further below, the hydrophobic conduits combined with alternating liquid and gas phases flowing through the line where a combined length scale of the liquid and gas phases is less than a length of the associated hydrophobic conduit may serve to electrically isolate the propellant in the thrusters 200 from the propellant tank (see tank 10 in FIG. 1). Without electrical isolation, the voltage applied to the thrusters may pass through the conductive propellant and back into the propellant tank, resulting in short circuits, massive power draws, and/or other system malfunctions.

In some embodiments, the propellant used in the bi-modal propulsion system may include volatile components. For example, ASCENT and other HAN-based propellants may include water. The reduced propellant pressure may be lower than the vapor pressure of the volatile component, resulting in evaporation of said component when exposed to vacuum, while non-volatile components (and/or components with vapor pressures below the reduced propellant pressure) may remain in the propellant. Evaporation of the volatile components may form bubbles within the propellant line. A non-wetting (e.g., hydrophobic) conduit may be used to transport the propellant, such that the formation of bubbles will result in gaps formed in the conduit due to the sequential arrangement of alternating gas and liquid phases in the line. For example, for a propellant with water, a hydrophobic conduit may be used, formed of PTFE, FEP, and/or any other insulation, non-wetting material. The length of the hydrophobic conduits 26 may be selected to ensure the propellant forms the two-phase (liquid and gas) flow along the conduit. The length of the conduits 26 may also be selected to ensure that at least more than one gap or bubble may be formed within the line, isolating the propellant from the propellant tank. In other words, an average characteristic length of the alternating gas and liquid phases (i.e., a length between phases of the same type) may be less than a 1, 0.5, 0.25, or any other portion of a length of an associated hydrophobic conduit the propellant flows through. In some embodiments, the length of the conduits 26 may be at least 25 cm.

It should be appreciated that any suitable material, arrangement, geometry (e.g., length, diameter), thermal properties, and/or electrical properties of the conduits/tubes or fittings may be employed, selected for specific operation requirements, as the present disclosure is not so limited.

As will be described in greater detail below, the volatile material (e.g., water vapor) may be outgassed at the thruster reservoir (e.g., if the reservoir is formed of a gas-permeable material), leaving the ionic liquid in the flow lines, allowing for proper operation of the thrusters. It should be appreciated that nominal changes in composition of the propellant due to evaporation of the volatile components may not affect the operation or performance of the thrusters.

In view of the above, the hydrophobic conduits 26, shown in FIG. 2, may serve to electrically isolate propellant from the common propellant tank. The propellant may flow from the feed system 23 to a thruster subassembly 2000 including one or more thrusters 200. The thruster subassembly may include a housing 201, which may be sealed under vacuum.

In some embodiments, the electrical isolation of the propellant via the hydrophobic conduits 26 may be tested by measuring the electrical impedance with an electrometer 28. The electrometer 28 may measure impedance between a point upstream (e.g., at couplings 25C) and a point downstream (e.g., at thrusters 200) from the hydrophobic conduits 26, as shown in FIG. 2) though other measurement locations may also be used.

Figure 3:
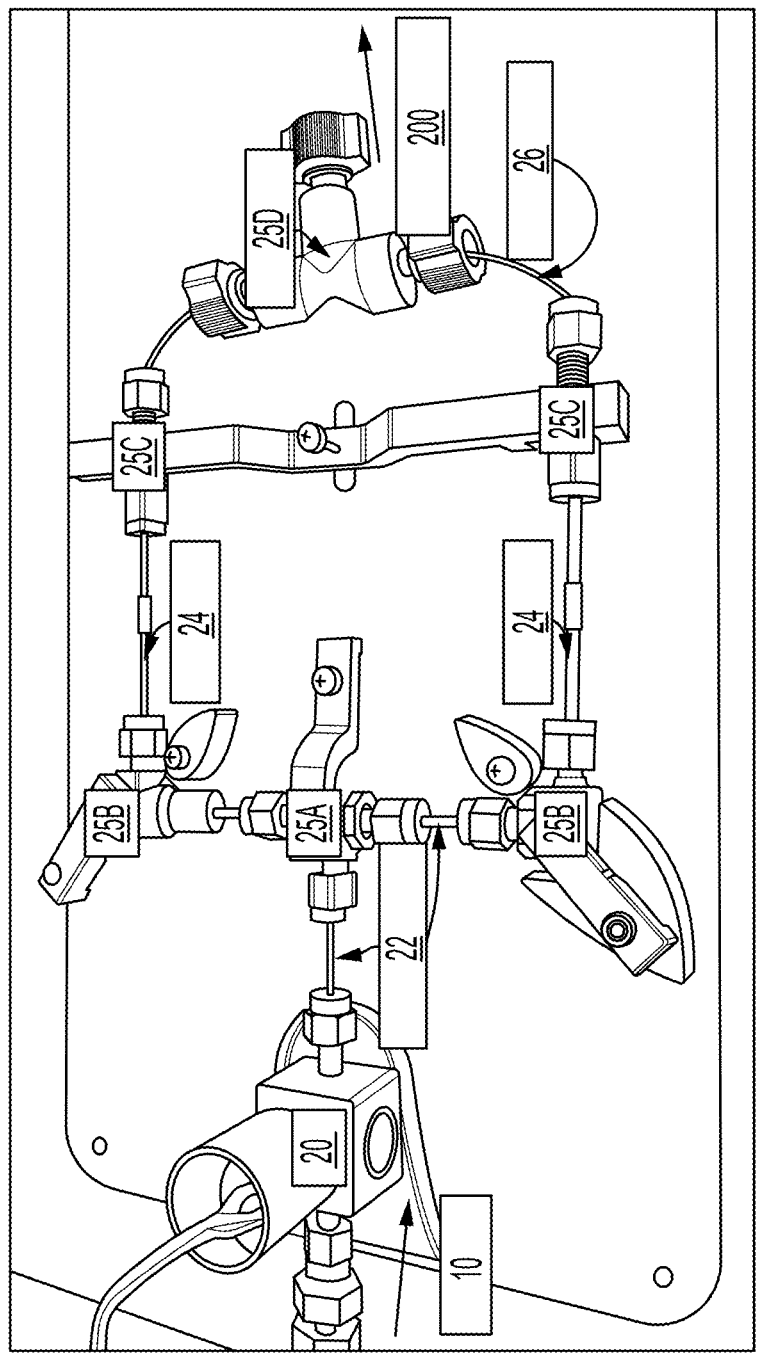
FIG. 3 shows, according to some embodiments, an electrical propulsion system.

FIG. 3 depicts one embodiment of an exemplary feed system for an electric thruster. FIG. 3 shows a propellant line flowing propellant from a tank 10 (not shown, see FIG. 1 for more detail) to an HPV 20 or other hydraulic control. The HPV 20 may control propellant flow between the tank (or any other intermediary HPV) and the feed system. The propellant may flow from the HPV 20 to one or more conduits 22, and subsequently to one or more capillaries 24. The capillaries 24 shown in FIG. 3 are formed of stainless steel, but any other suitable material compatible with the propellant (which may, in some embodiments, be ionic and/or conductive) and high pressure may be employed. The capillaries 24 may serve to reduce the pressure of the propellant, in some embodiments, to a pressure less than the vapor pressure of one or more volatile components of the propellant. Accordingly, the propellant may phase segregate into a two-phase flow including separate liquid and gas phases (e.g., liquid non-volatile components and vaporized volatile components) at the outlet of the capillaries 24. The two-phase propellant may then flow to one or more hydrophobic conduits 26, which may serve to electrically isolate the propellant from the tank. The propellant may then flow to one or more thrusters 200 for operation. As described previously with respect to FIG. 2, the feed system may include one or more fittings 25A, 25B, 25C, 25D to route, couple, and/or split propellant lines. It should be appreciated that the setup shown in FIG. 3 is for explanation purposes only, and that the various components of the feed system (and the bi-modal propulsion system in general) may be arranged in any suitable manner, as the present disclosure is not limited by the exemplary embodiments of FIGS. 2-3.

Figure 4:
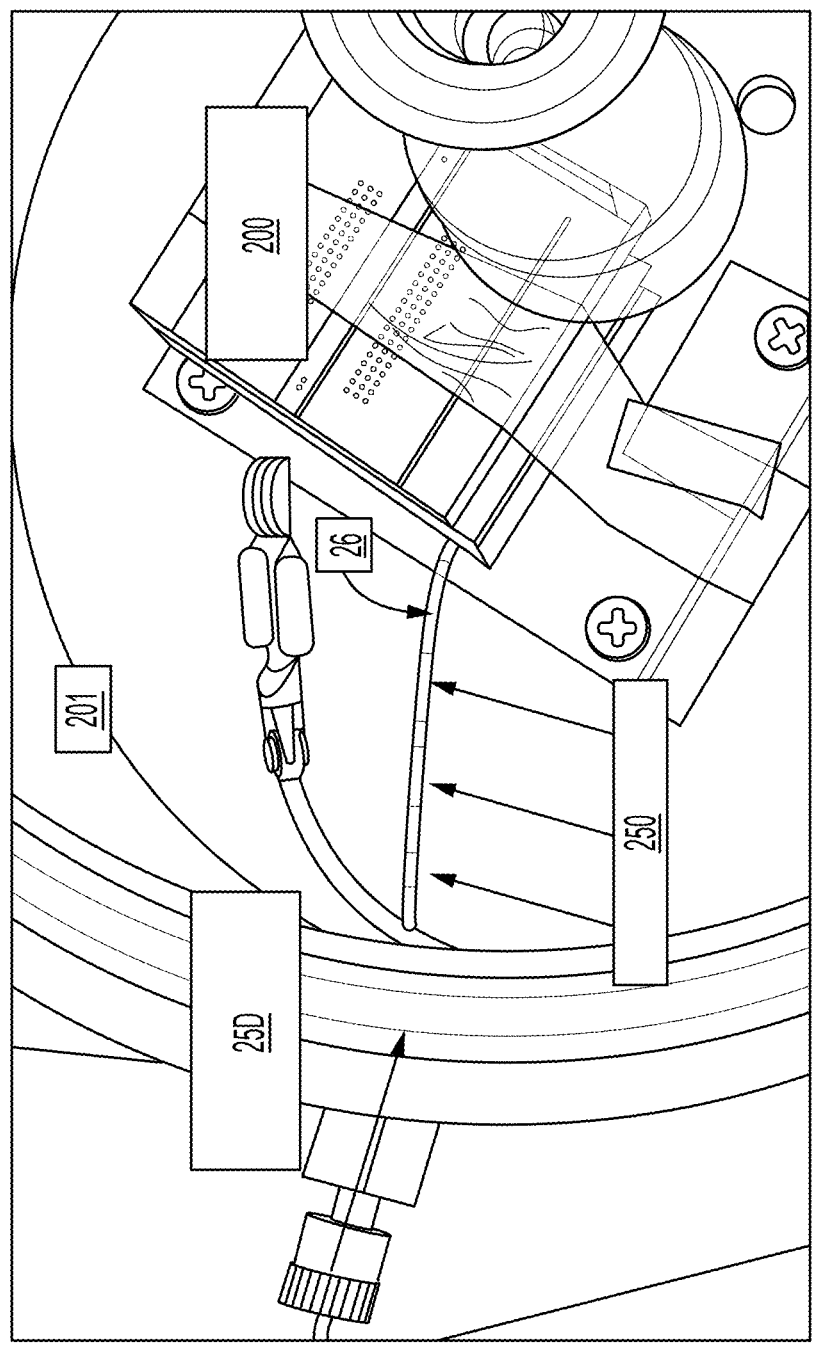
FIG. 4 shows, according to some embodiments, a close-up of an electrical propulsion system.

FIG. 4 shows a close-up of propellant flowing from the feed system (e.g., shown in FIGS. 2 and 3) to a thruster 200. The photograph was taken from above a housing 201 (e.g., a desiccator with a transparent top), FIG. 4 shows the two-phase flow of alternating gas and liquid propellant phases flowing through the feed system from above a housing 201 (e.g., a desiccator with a transparent top). In particular, bubbles or gaps 250 are indicated with arrows, flowing through the hydrophobic conduit 26 positioned between the feed system and the thruster 200. As noted previously, the bubbles or gaps 250 may electrically isolate the propellant from the common propellant tank upstream.

Figure 5:
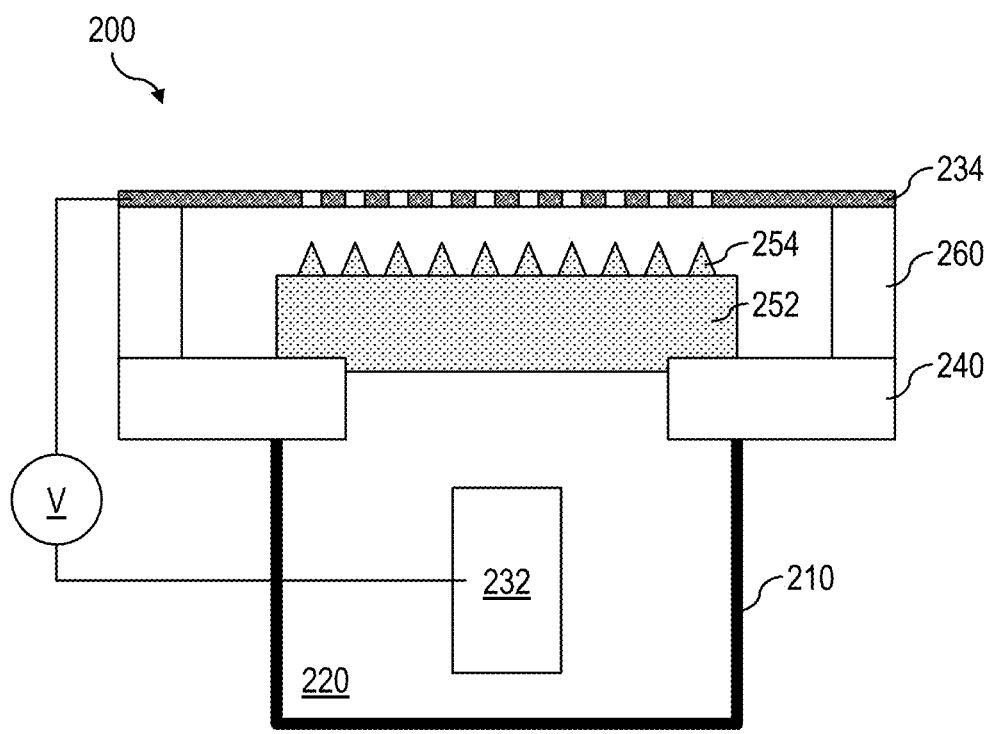
FIG. 5 shows, according to some embodiments, a schematic diagram of an electrical thruster.

FIG. 5 shows a thruster 200 according to some embodiments. The thruster 200 may be an ionic electrospray system, wherein a high voltage may be applied to an ionic liquid (e.g., the propellant) to induce flow through an array of sharp tips, and subsequent ionic evaporation, which may result in thrust. In such a system, a voltage may be applied across electrodes 232, 234, as shown in FIG. 5. The electrodes may be separated with an insulating layer 260 and support layer 240 to prevent short-circuiting of the system. One electrode 232 may be positioned in a reservoir 210 filled with conductive ionic propellant 220. Accordingly, applying a voltage to the electrode 232 may energize the propellant 220, and drive said propellant towards electrode 234. Electrode 234 may be referred to as an extractor electrode, due to its function "extracting" ionic vapor from the sharp tips 254. The propellant 220 may then flow from the reservoir 210 into a substrate 252 connected to the array of sharp tips 254, which may be referred to as emitters, due to their function of emitting ionic vapor. The substrate 252 and tips 254 may be formed of a porous and/or granulated material, such that propellant 220 may flow through due to a combination of electrical driving force as well as capillarity, which may be particularly useful in spaceflight applications without gravity. In some embodiments, the reservoir 210 may be formed of a gas-permeable material to allow vapor components of the propellant 220 to flow out upstream of the tips 254.

Figure 6:
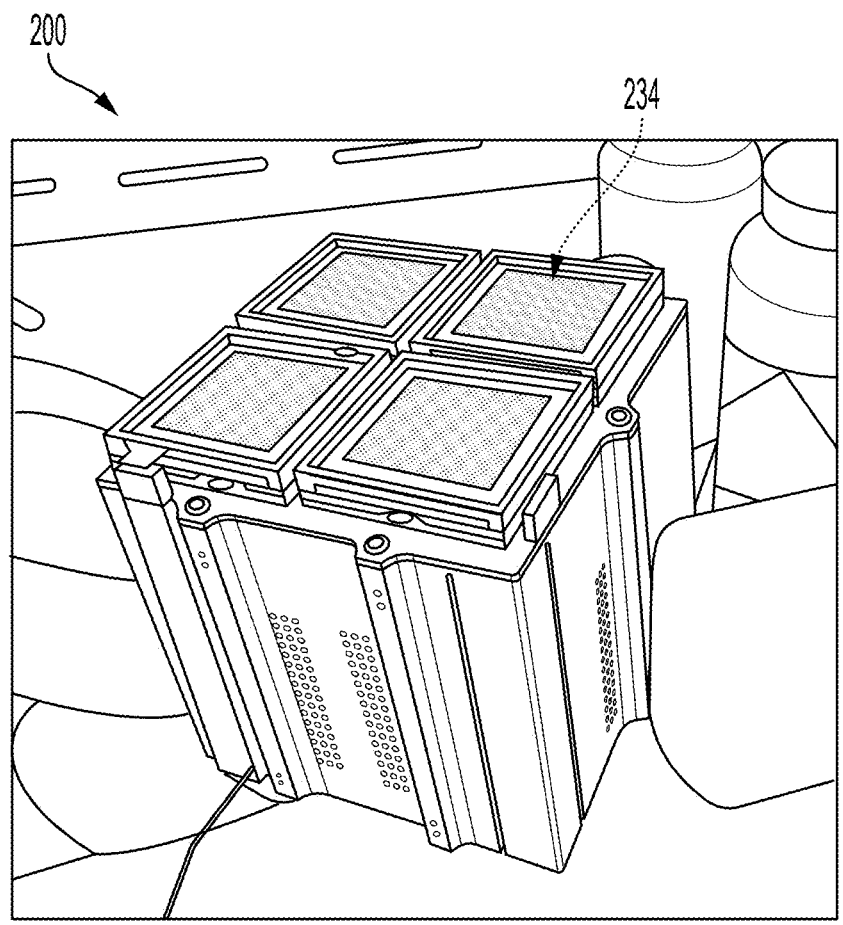
FIG. 6 shows, according to some embodiments, a perspective top view of an electrical thruster.
Figure 7:
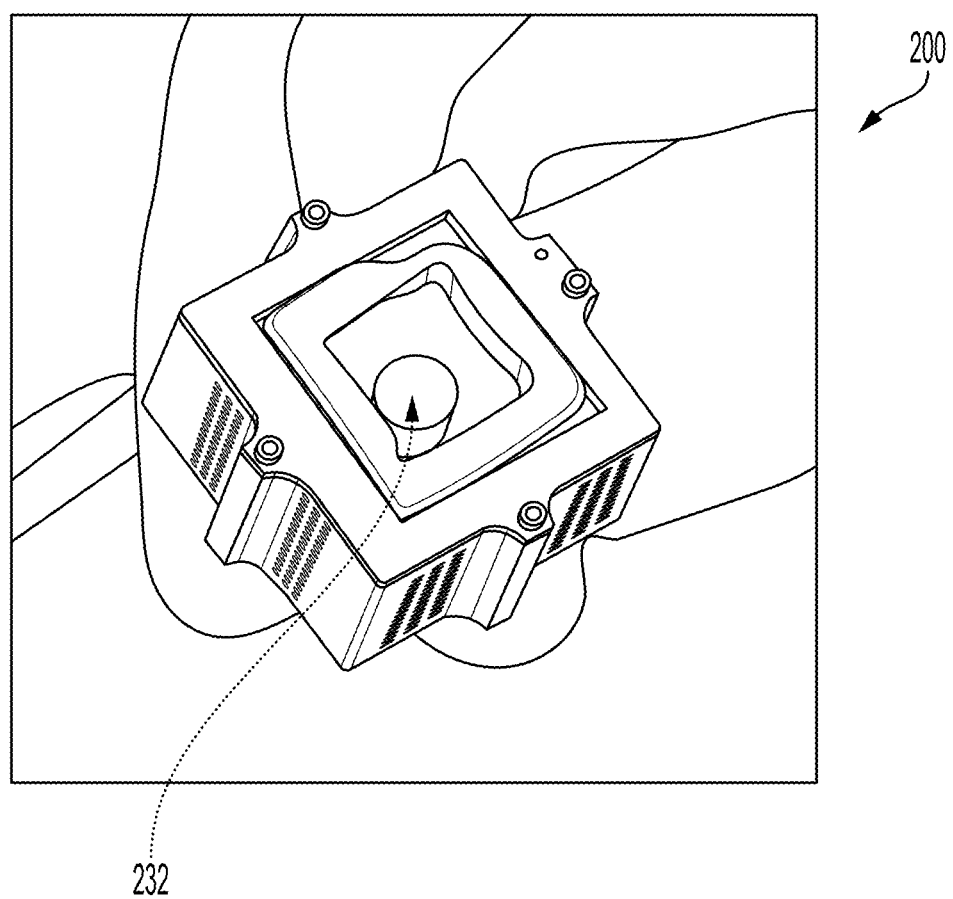
FIG. 7 shows, according to some embodiments, a perspective top view of an electrical thruster.

FIG. 6 shows an embodiment of an exemplary electrospray thruster 200 with four sets of extractor electrodes 234 mounted on a large (10 mL) propellant reservoir. Each electrode corresponds to an array of emitter tips, as described previously. FIG. 7 shows a perspective top view of an electrical thruster, with emitters and associated structures removed and replaced with a viewpoint to better view an electrode 232. In some embodiments, the electrode 232 may be formed of graphite, and/or any other suitable electrically conductive material.

In operation, the bi-modal propulsion system may switch between the chemical and electrical propulsion subsystems based on operational requirements (e.g., thrust needs). The chemical propulsion subsystem (see subsystem 12A in FIG. 1) may function similarly to conventional single-mode propulsion systems. The feed pressure of propellant stored in a common propellant tank may be adjusted to suit specific operational requirements of the chemical propulsion subsystem using one or more controls. As noted previously, the chemical propulsion subsystem may employ propellant at pressures in the hundreds of psi (e.g., 400-800 psi), which may be pressurized with inert gases, such as nitrogen. In some embodiments, the propellant may be filtered (e.g., through a 40-micron particulate filter) prior to flowing to the various subsystems.

Given the high pressure of the propellant, the electrical propulsion subsystems, which conventionally employ low pressure (e.g., <10 psi) propellant, may not operate conventionally. For example, electrospray thrusters may not have pre-loaded propellant in their respective propellant reservoirs, as is typical for electrospray thruster operation. Instead, the reservoirs may be filled and refilled as required. In some embodiments, the thrusters may be inactivated (e.g., firing voltage turned off or below firing threshold) during reservoir refilling, which may be short (e.g., 1-2 minutes).

Figure 8:
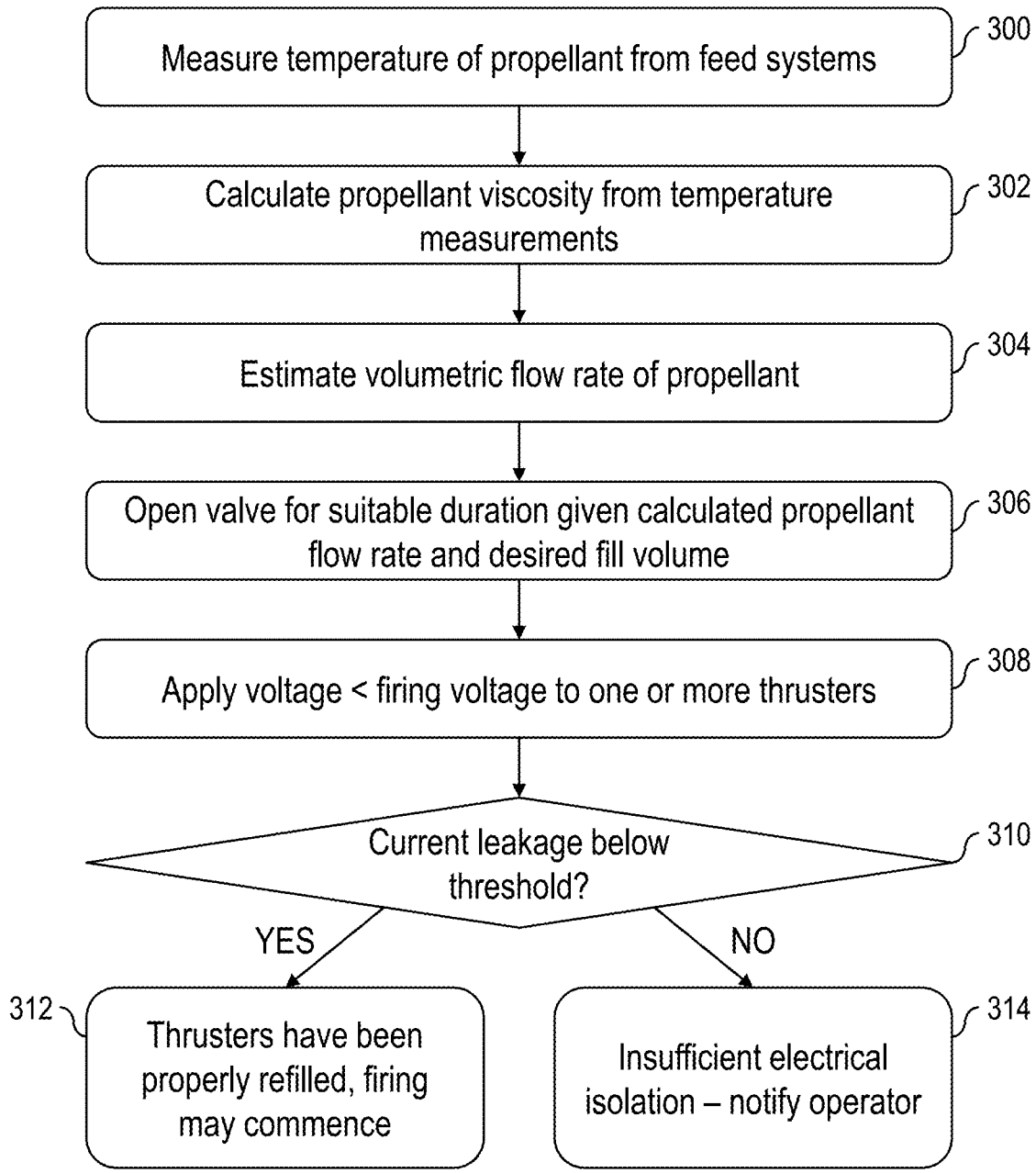
FIG. 8 shows, according to some embodiments, a flow chart for a method of operating an electrical propulsion system.

In some embodiments, the refill process may be controlled electronically (e.g., with one or more controllers such as one or more associated processors). FIG. 8 shows, according to some embodiments, a flow chart for refilling an electrospray thruster reservoir. In block 300, the propellant temperature is measured. In some embodiments, the propellant temperature may be measured at the capillaries (see capillaries 24 in FIG. 2), given the thermal conductivity of the capillaries. Any suitable temperature measurement system may be employed to measure the propellant temperature. The measured temperature may then be used to calculate the propellant viscosity, as shown in block 302. Fluid viscosity can be sensitive to temperature, such that direct temperature measurements of the propellant may be desired for accurately determining propellant viscosity. The viscosity may be determined based on pre-existing relationships or tabulated values as a function of temperature. In some embodiments, the propellant viscosity may be directly measured without a temperature measurement. The propellant viscosity may then be used to calculate propellant flow rate, as shown in block 304. In some embodiments, the flow rate may be calculated based on Equation 1 above, which uses the known geometry of the capillaries (e.g., diameter and length), feed pressure from the propellant tank, and the propellant viscosity. The flow rate may then be used to calculate how long an associated HPV, or other flow control component, may be opened to allow a desired volume of propellant to flow through. The aforementioned one or more controllers (e.g., one or more processors) associated with the bi-modal propulsion system may be capable of measuring, storing, and calculating the steps shown in block 300-304, as well as instructing one or more valves or other flow control components to open for the calculated duration, as shown in block 306.

As described previously, electrical isolation between the common propellant tank and the electrical thrusters may reduce the risk of system dysfunction. As such, once the electrospray reservoirs have been filled, one or more controllers may verify electrical isolation by applying a small voltage (below the firing voltage) to the thrusters, as shown in block 308. The leakage current of the system may then be measured and compared to a threshold current (100 µA), as shown in block 310. The threshold current may be adjusted based on operational parameters, to help determine whether or not the system is properly electrically isolated (e.g., via hydrophobic conduits as described previously). If the leakage current is below the threshold current, the system may be determined to have been properly refilled and electrically isolated from the propellant tank. The thrusters may then be fired, as shown in block 312, with low risk of short circuiting the entire bi-modal system and significant damage. The thrusters may be continuously fired until the reservoirs are depleted, and another refilling process may take place, if necessary. If the leakage current is above the threshold current, it may be an indication of insufficient electrical isolation, as shown in block 314. The system may inform an operator or follow any other suitable procedure to regain electrical isolation. It should be appreciated that any number of safety measures may be in place to reduce the risk of firing the electrical thrusters when electrical isolation has not been sufficiently verified.

Figure 9:
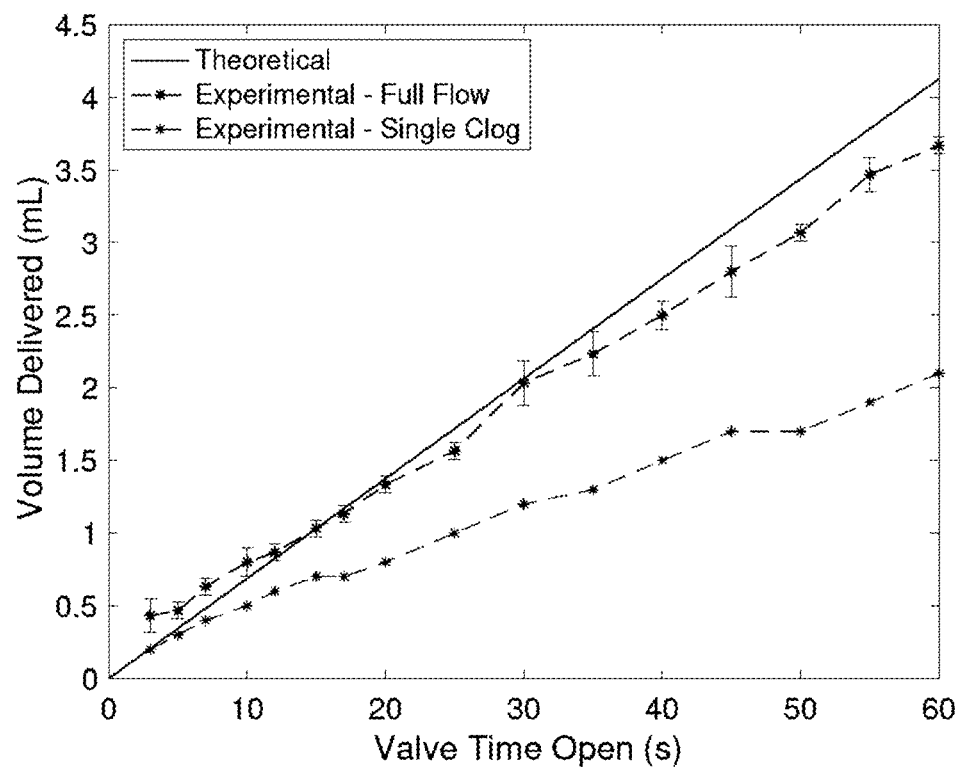
FIG. 9 shows, according to some embodiments, a plot of delivered volume as a function of time.

FIG. 9 shows a plot of propellant volume as a function of time for measuring propellant flow rate. The theoretical flow rate of the propellant flowing through a capillary, the slope of the data shown in FIG. 9, was determined to be 0.069 mL/s for a feed system with two capillary lines with length of 5 cm each and inner diameters of 127 microns, using Equation 1 above. The experimentally derived data was measured by optically measuring volumetric outflow of stimulated propellant (with similar viscosity to actual propellant) from the capillary. The flow rate of the experimental double capillary was determined to be 0.058 mL/s. An experiment involving a clogged tube, stimulating potential dysfunction of at least one capillary, is also shown in FIG. 9. It should be appreciated that the reduced flow rate of the propellant associated with a single capillary is preferable, as it may result in an underfilling of the thruster reservoir. In contrast, an increased flow rate may result in overfilling of the reservoir and subsequent dysfunction, damage, or failure of the thrusters.

Figure 10:
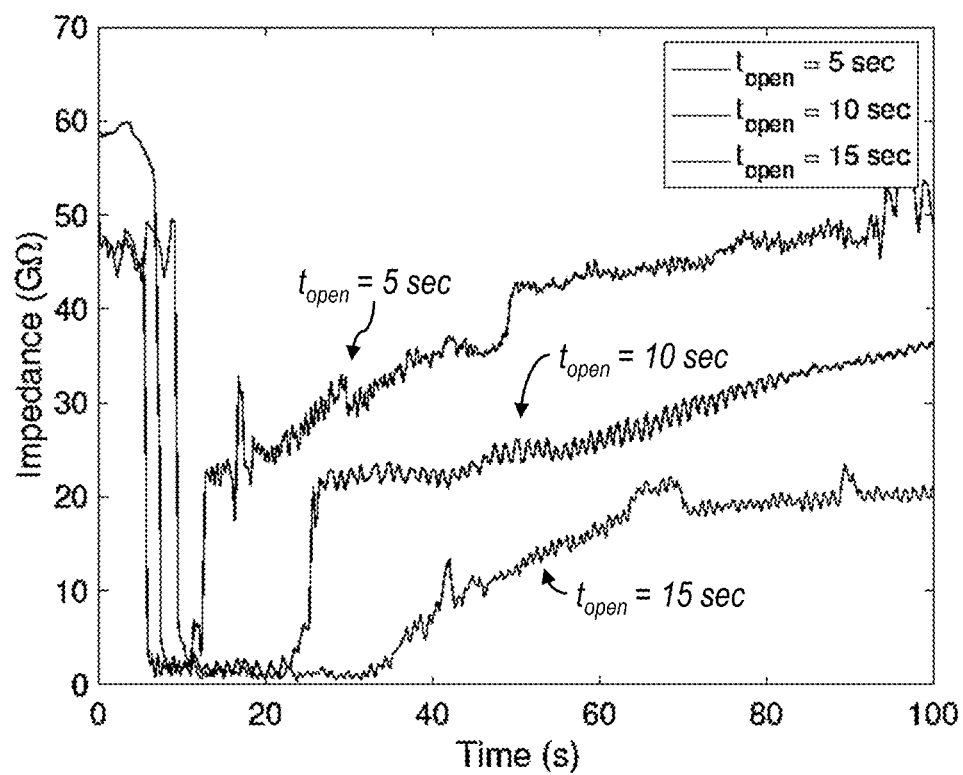
FIG. 10 shows, according to some embodiments, a plot of impedance of an electrical propulsion system as a function of time.

FIG. 10 shows a plot of measured electrical impedance as a function of time for three different valve open times $t_{open}$ of 5 seconds, 10 seconds, and 15 seconds. As described with respect to FIG. 2, the impedance of the subsystem may be measured between the thrusters and the fitting in between the capillaries and the hydrophobic conduit. The data collected in FIG. 10 was measured with a Model 6514 system Electrometer (Keithley Instruments). As shown in FIG. 10, when a respective HPV is opened to deliver propellant, a continuous flow (e.g., no gaps or bubbles) of propellant flowed into the thruster reservoir, such that the instrument measured a low impedance value. In contrast, when the HPV is closed, the propellant flow is dramatically slowed down, which may allow bubbles to form, as shown in the greater impedance values measured by the electrometer.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The invention claimed is:

1. A propulsion system comprising:
   a tank configured to hold an ionic liquid at a first pressure;
   at least one electrical thruster in selective fluid communication with the tank, wherein the first pressure is greater than an operational pressure range of the at least one electrical thruster;
   at least one capillary positioned along a flow path between the tank and the at least one electrical thruster, the at least one capillary in fluid communication with the tank and the at least one electrical thruster; and
   at least one conduit fluidly coupling the at least one capillary and the at least one electrical thruster, wherein the ionic liquid does not wet a material of the at least one conduit,
   wherein the at least one capillary is configured to de-pressurize the ionic liquid from the first pressure to a second pressure less than the first pressure,
   wherein the second pressure is below a vapor pressure of at least one volatile component of the ionic liquid, and
   wherein the second pressure is within the operational pressure range of the at least one electrical thruster.

2. The propulsion system of claim 1, wherein the second pressure is at least 0.1 times less than the first pressure.

3. The propulsion system of claim 1, further comprising:
   one or more valves positioned upstream of the at least one electrical thruster; and
   one or more processors configured to control flow of the ionic liquid with the one or more valves.

4. The propulsion system of claim 1, wherein the at least one electrical thruster is an electrospray thruster.

5. The propulsion system of claim 1, wherein the ionic liquid is a monopropellant.

6. The propulsion system of claim 1, wherein the tank is in selective fluid communication with at least one chemical thruster.

7. The propulsion system of claim 1, wherein the at least one volatile component at least partially evaporates within the at least one conduit to form a gas phase, and wherein the gas phase electrically isolates the at least one electrical thruster from the tank.

8. A propulsion system comprising:
   a tank configured to hold an ionic liquid, the ionic liquid comprising at least one volatile component;
   at least one electrical thruster in selective fluid communication with the tank; and
   at least one conduit positioned in between the tank and the at least one electrical thruster,
   wherein an inlet pressure of the at least one conduit is below a vapor pressure of the at least one volatile component, wherein the at least one volatile component at least partially evaporates within the at least one conduit to form a gas phase, and wherein the gas phase electrically isolates the at least one electrical thruster from the tank.

9. The propulsion system of claim 8, wherein the ionic liquid does not wet a material of the at least one conduit.

10. The propulsion system of claim 8, further comprising at least one capillary positioned along a flow path between the tank and the at least one electrical thruster, wherein the at least one capillary is configured to de-pressurize the ionic liquid to an operational pressure range of the at least one electrical thruster.

11. The propulsion system of claim 8, further comprising:
    one or more valves positioned upstream of the at least one electrical thruster; and
    one or more processors configured to control flow of the ionic liquid with the one or more valves.

12. The propulsion system of claim 8, wherein the at least one electrical thruster is an electrospray thruster.

13. The propulsion system of claim 8, wherein the ionic liquid is a monopropellant.

14. The propulsion system of claim 8, wherein the tank is in selective fluid communication with at least one chemical thruster.

15. The propulsion system of claim 10, wherein the at least one capillary is configured to de-pressurize the ionic liquid to an outlet pressure at least 0.1 times less than the inlet pressure.

16. A propulsion system comprising:
    a tank configured to hold an ionic liquid at a first pressure;
    at least one chemical thruster in selective fluid communication with the tank;
    at least one electrical thruster in selective fluid communication with the tank, wherein the first pressure is greater than an operational pressure range of the at least one electrical thruster; and
    at least one feed system disposed along a flow path between the at least one electrical thruster and the tank, wherein the at least one feed system is configured to de-pressurize the ionic liquid from the first pressure to a second pressure less than the first pressure, and wherein the second pressure is within the operational pressure range of the at least one electrical thruster, wherein the at least one feed system includes:
at least one capillary positioned along the flow path between the tank and the at least one electrical thruster, wherein the at least one capillary is configured to de-pressurize the ionic liquid from the first pressure to the second pressure; and
at least one conduit fluidly coupling the at least one capillary and the at least one electrical thruster, wherein an inlet pressure of the at least one conduit is below a vapor pressure of at least one volatile component of the ionic liquid, wherein the ionic liquid does not wet a material of the at least one conduit.

17. The propulsion system of claim 16, wherein the second pressure is at least 0.1 times less than the first pressure.

18. The propulsion system of claim 16, wherein the at least one electrical thruster is an electrospray thruster.

19. The propulsion system of claim 16, wherein the ionic liquid is a monopropellant.

20. The propulsion system of claim 16, further comprising:
one or more valves positioned upstream of the at least one electrical thruster; and
one or more processors configured to control flow of the ionic liquid with the one or more valves.

* * * * *